United States Patent
Lin

(10) Patent No.: US 6,530,446 B1
(45) Date of Patent: Mar. 11, 2003

(54) SEPARABLE FRAME FOR AN ELECTRIC SCOOTER

(76) Inventor: Samuel Lin, 6, Kung Yeh 2 Rd., Tou Chiao Industrial Park, Min Hsiung Hsiang, Chia Yi Hsien (TW)

(*) Notice: Subject to any disclaimer, the term of this patent is extended or adjusted under 35 U.S.C. 154(b) by 0 days.

(21) Appl. No.: 09/975,987

(22) Filed: Oct. 15, 2001

(51) Int. Cl.⁷ ............................................. B62D 61/00
(52) U.S. Cl. .................. 180/208; 180/210; 280/DIG. 5
(58) Field of Search .................. 180/210, 208; 280/87.01, 87.021, 87.05, 287, 785, DIG. 5; 403/321, 322.1, 322.4, 320, 342, 343, 373, 374.1, 374.5

(56) References Cited

U.S. PATENT DOCUMENTS

| | | | | |
|---|---|---|---|---|
| 3,641,598 A | * | 2/1972 | Feldstein ........................ | 5/100 |
| 4,909,525 A | * | 3/1990 | Flowers ........................ | 280/30 |
| 4,944,359 A | * | 7/1990 | Doman et al. .............. | 180/208 |
| 5,074,372 A | * | 12/1991 | Schepis ...................... | 180/208 |
| 5,154,251 A | * | 10/1992 | Fought ........................ | 180/208 |
| 6,170,592 B1 | * | 1/2001 | Wu .............................. | 180/208 |
| 6,336,517 B1 | * | 1/2002 | Cheng ......................... | 180/208 |
| 6,439,331 B1 | * | 8/2002 | Fan .............................. | 180/208 |

* cited by examiner

*Primary Examiner*—Lesley D. Morris
*Assistant Examiner*—Tony Winner
(74) *Attorney, Agent, or Firm*—Fei-Fei Chao; Venable, Baetjer, Howard & Civiletti

(57) ABSTRACT

A frame for an electric scooter has a front half-frame, a rear half-frame and at least one locking device. The rear half-frame is detachably connected to the front half-frame with at least one locking device. Each locking device has a locking plate, an arm and a pin. The locking plate is secured to one of the frame halves, and the arm and the pin are mounted on the other half-frame. The pin is retractably mounted the half-frame and has one end inserted into a bore defined in the locking plate. The arm is pivotally attached to the half-frame to pull the pin to disengage from the bore when the arm pivots relative to the half-frame. Accordingly, the front half-frame can be detached from the rear half-frame. To package, store or transport the electric scooter with the separable frame is more convenient.

16 Claims, 4 Drawing Sheets

SEPARABLE FRAME FOR AN ELECTRIC SCOOTER

BACKGROUND OF THE INVENTION

1. Field of the Invention

The present invention relates to a frame, and more particularly to a separable frame for an electric scooter to reduce the size of the scooter.

2. Description of Related Art

An electric scooter is used to move a person from place to place at a low speed. The conventional electric scooter substantially comprises a frame, at least one front wheel, two rear wheels, a seat, an electric motor and a steering bar. The wheels are rotatably mounted on the frame. The seat is mounted on the frame for a user to sit. The electric motor is mounted on the frame to drive the rear wheels. The steering bar is pivotally mounted on the frame and is connected to each front wheel. The user can control the direction of the electric scooter by means of pivoting the steering bar relative to the frame.

However, the conventional frame of the electric scooter is a single unit. The conventional frame cannot be separated into separate parts. To package or to transport the electric scooter with a conventional frame requires a large space and is inconvenient.

To overcome the shortcomings, the present invention provides an improved frame for an electric scooter to mitigate or obviate the aforementioned problems.

SUMMARY OF THE INVENTION

The main objective of the invention is to provide an improved frame for an electric scooter, which can be separated into two independent parts to conveniently pack, store and transport the scooter. The frame has a front half frame, a rear half frame and at least one locking device. The rear half frame is detachably attached to the front half frame with the at least one locking device. Each locking device has a locking plate, an arm and a pin. The locking plate is secured to either the front half frame or the rear half frame, and the arm and the pin are mounted on the other half frame. A bore is defined in the locking plate. The pin is retractably mounted in the half frame and has one end extending out from the half frame to insert into the bore in the locking plate. The arm is pivotally attached to the half frame to pull the pin and move it relative to the half frame when the arm pivots relative to the half frame. Accordingly, the front half frame can be detached from the rear half frame. To package, to store and to transport the electric scooter with the separable frame is more convenient.

Other objects, advantages and novel features of the invention will become more apparent from the following detailed description when taken in conjunction with the accompanying drawings.

DETAILED DESCRIPTION OF PREFERRED EMBODIMENT

Figure 1:
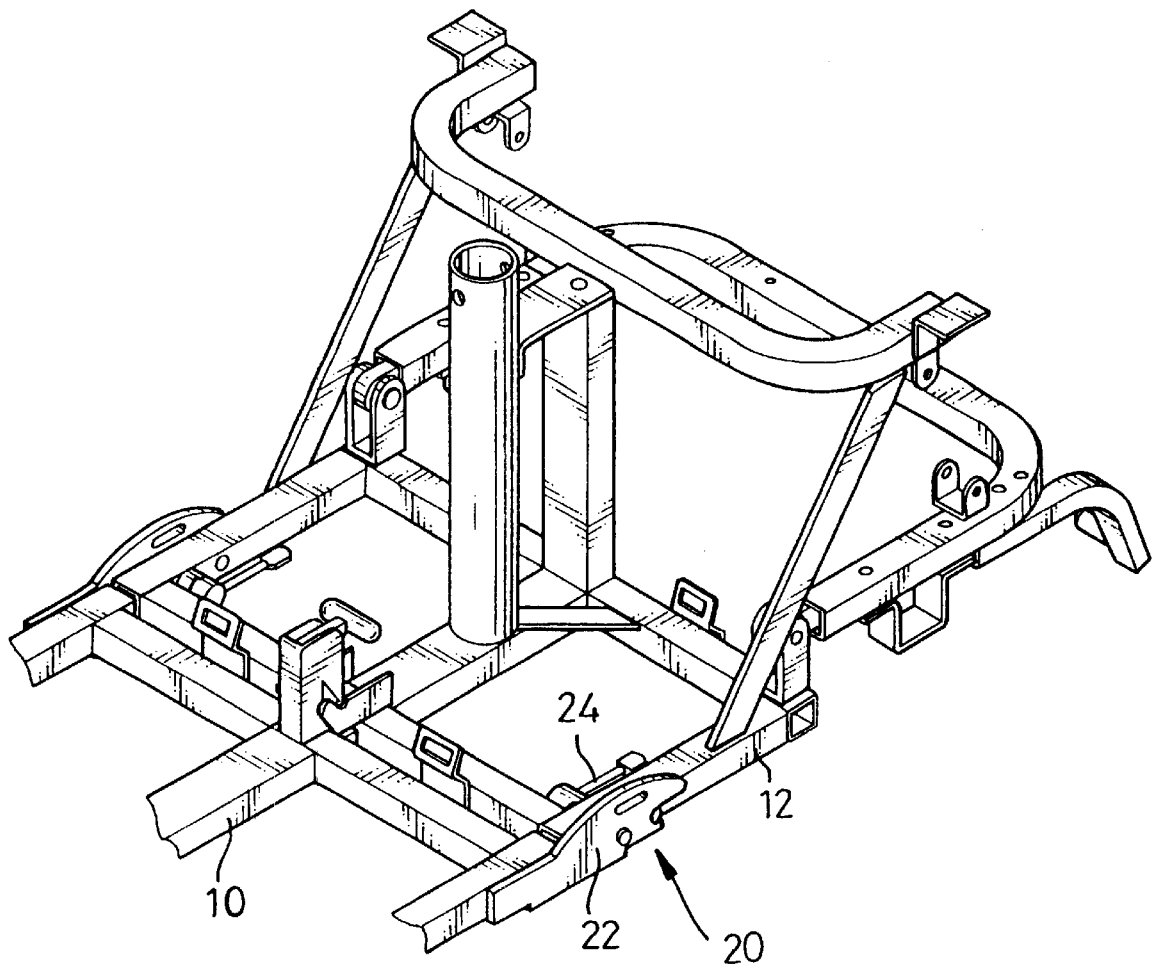
FIG. 1 is a partial perspective view of a separable frame in accordance with the present invention.

With reference to FIG. 1, a separable frame for an electric scooter in accordance with the present invention comprises a front half-frame (10), a rear half-frame (12) and at least one locking device (20). The front half-frame (10) and the rear half-frame (12) are constructed from multiple tubes (not numbered). The front half-frame (10) is adapted to mount the front wheels (not shown) and the steering bar (not shown) of the scooter, and the rear half-frame (12) is adapted to mount the rear wheels (not shown), the seat (not shown) and the electric motor (not shown) of the scooter. The front half-frame (10) and the rear half-frame (12) are connected with the locking device (20) to form a whole frame.

Figure 2:
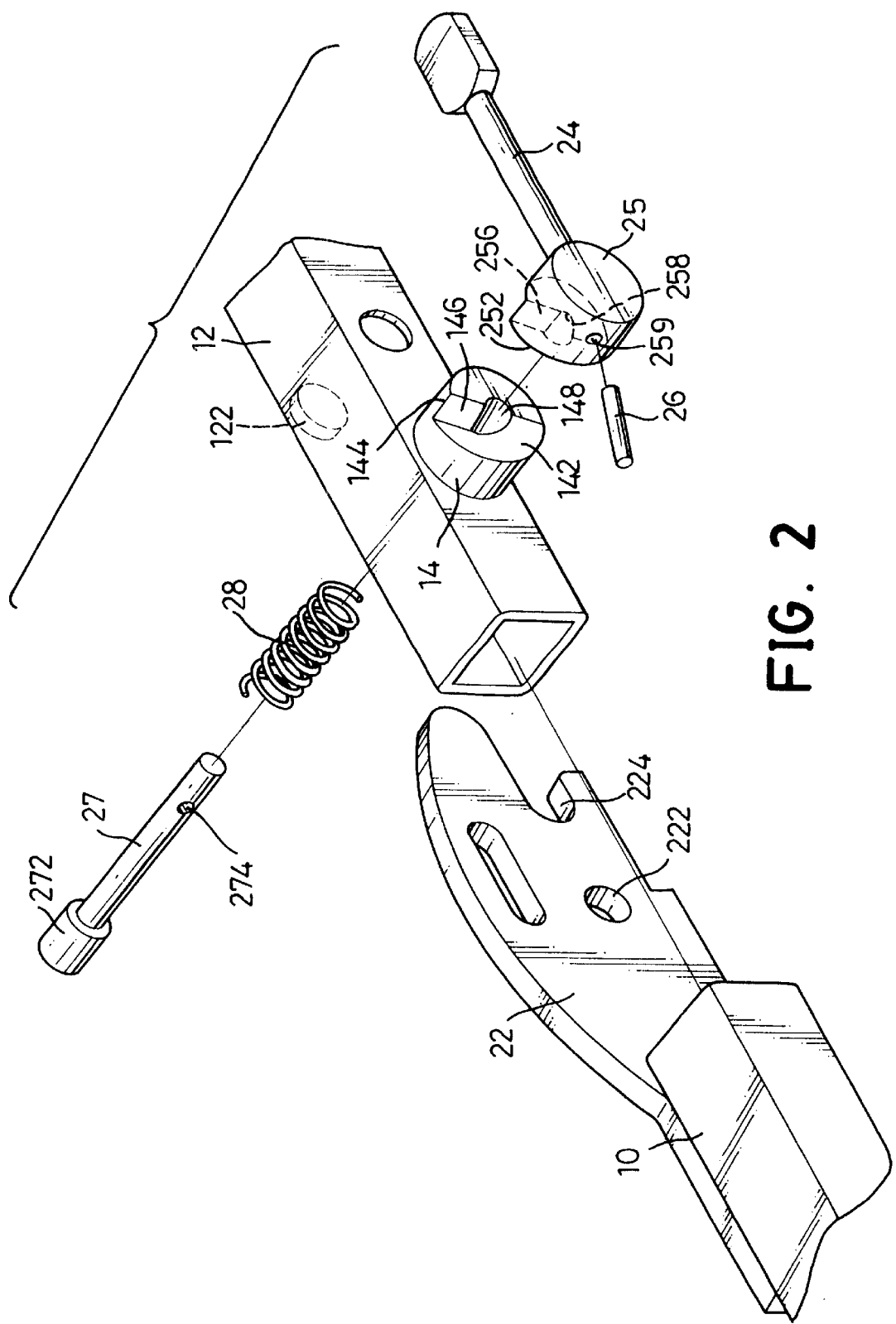
FIG. 2 is an exploded perspective view of a joint with the locking device of the separable frame in FIG. 1.
Figure 3:
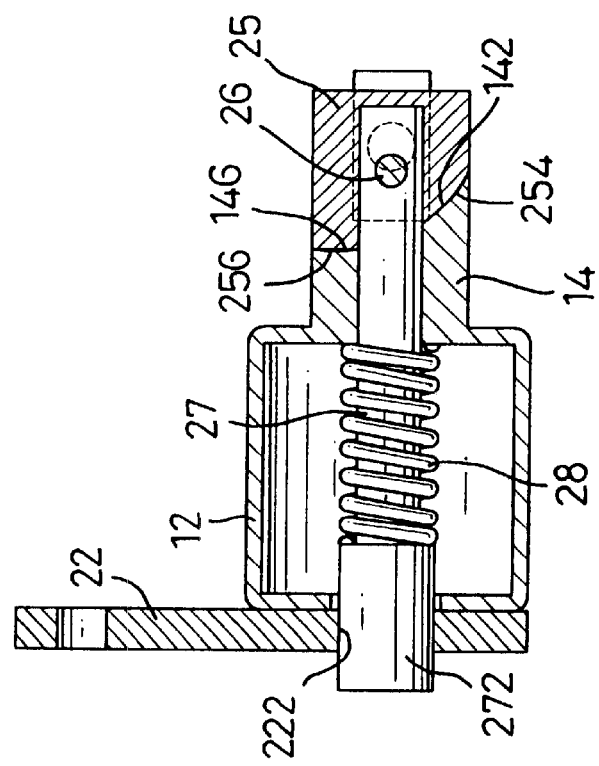
FIG. 3 is a side plan view in partial section of the locking device of the frame in FIG. 1 showing the halves of the frame locked with the locking device.
Figure 5:
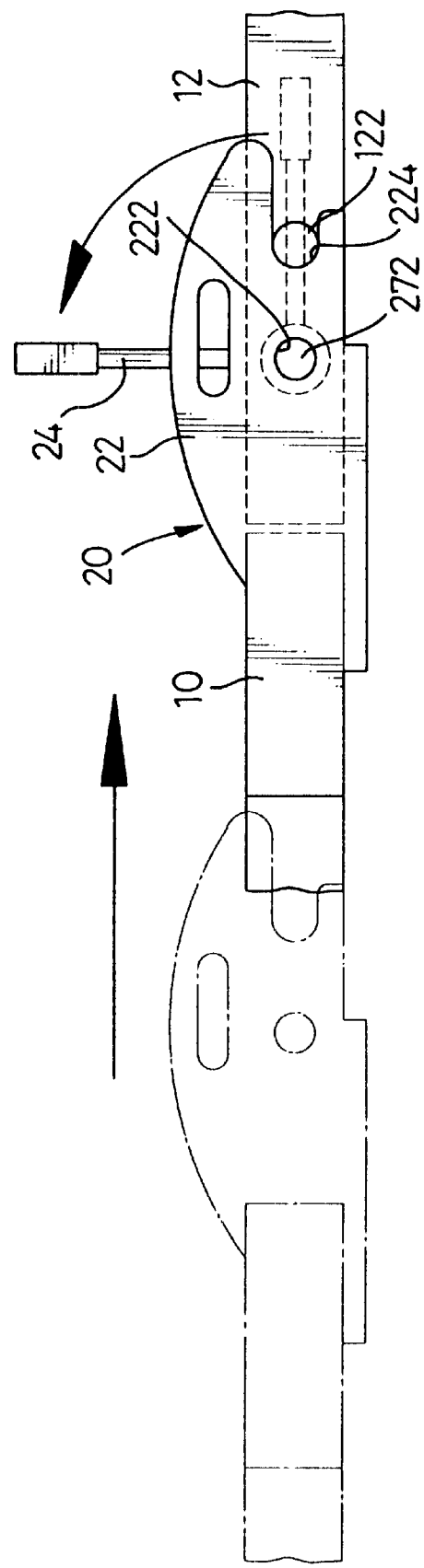
FIG. 5 is an operational top plan view of the frame in FIG. 1 showing the process of attaching the front half frame and the rear half frame with the locking device.

With reference to FIGS. 2 and 3, each locking device (20) comprises a locking plate (22), a pin (27) and an arm (24). The locking plate (22) has an attached end (not numbered) and a free end (not numbered). The attached end of the locking plate (22) is securely attached to the front half-frame (10), and the free end extends toward the rear half-frame (12). A bore (222) is defined in the locking plate (22). A recess (224) is defined in the free end of the locking plate (22).

The pin (27) is retractably mounted in the rear half-frame (12) and has a head (272). The head (272) with a diameter larger than that of the pin (27) extends out from the rear half-frame (12). The head (272) of the pin (27) is inserted into the bore (222) in the locking plate (22), such that the front half-frame (10) and the rear half frame (12) will be securely connected by means of the engagement between the bore (222) in the locking plate (22) and the head (272) of the pin (27).

The arm (24) is pivotally mounted on the rear half-frame (12) to cause the pin (27) to engage with or disengage from the bore (222). In practice, a stub (14) is integrally formed on the rear half-frame (12). The arm (24) is rotatably connected to the stub (14). A through hole (148) is defined through the stub (14), and the pin (27) extends through the through hole (148). A spiral recess (not numbered) is defined longitudinally in the free end of the stub (14) and around the through hole (148). The spiral recess around half the circumference of the stub (14) from the free end defines a spiral face (142). A shoulder (146) is formed between the deepest end of the spiral face (142) and the free end of the stub (14.

A knob (25) is formed on one end of the arm (24) and is rotatably attached to the stub (14). A blind hole (258) is defined in the knob (25) perpendicular to the arm (24). The pin (27) extend into the blind hole (258). A keyhole (259) is radially defined in the knob (25) and communicates with the blind hole (258). A key-pin (26) extends through the keyhole (259) and into a locking-hole (274) defined in the pin (27) to securely connect the pin (27) to the knob (25). The knob (25) and the arm (24) are pivotally connected to the stub (14) by the pin (27).

An spiral extension (252) corresponding to the spiral face (142) on the end of the stub (14) integrally protrudes from the free end of the knob (25) and abut the spiral face (142) on the stub (14). The spiral extension (252) forms a spiral face (254) on the free end of the spiral extension (252) and mates with the spiral face (142) on the stub (14). A shoulder (256) is formed between the end of the extension (252) and the knob (25) to abut to the shoulder (146) on the stub (14).

The rotation of the arm (24) is limited by the abutment of the shoulders (146, 256) on the stub (14) and the knob (25).

A biasing member (28) is mounted in the rear half-frame (12) and has two ends respectively abutting the head (272) on the pin (27) and the rear half-frame (12).

Figure 4:
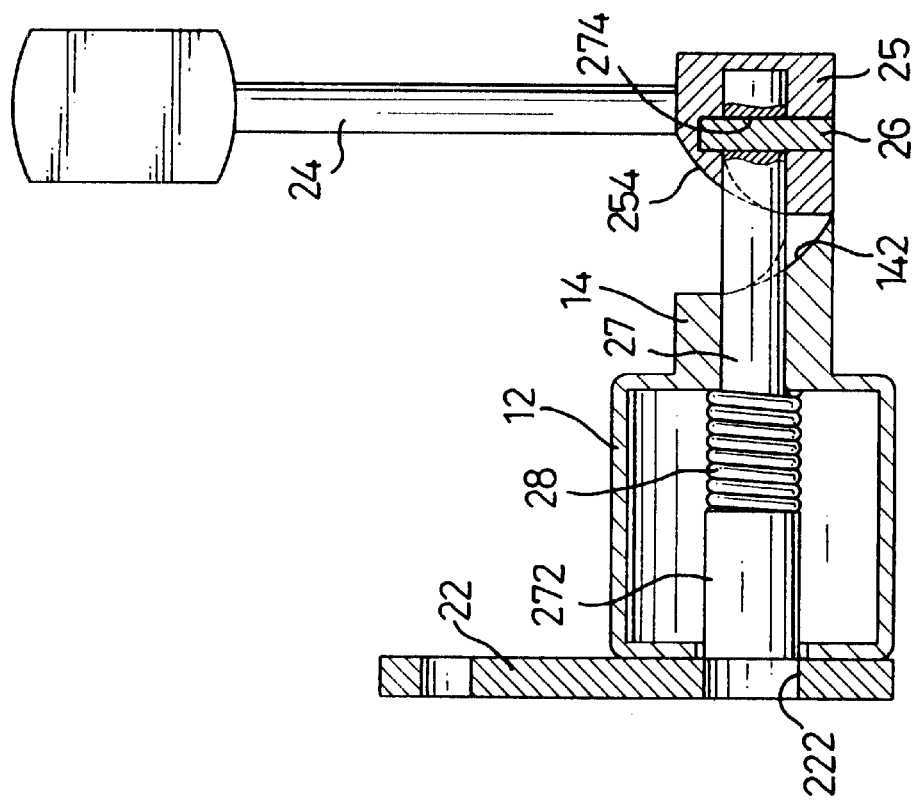
FIG. 4 is a side plan view in partial section of the locking device of the frame in FIG. 1 showing the locking device unlocked.

With reference to FIGS. 2 to 4, the frame is separated by rotating the arm (24) relative to the rear half-frame (12). As the knob (25) rotates relative to the stub (14), spiral faces (142, 254) press against each other and cause the knob (25) to move out from the stub (14). Consequently, the pin (27) will be pulled into the rear half frame (12) by the movement of the knob (25), and the head (272) on the pin (27) will disengage from the bore (222) in the locking plate (22). The locking device (20) will be unlocked. Accordingly, the front half-frame (10) can be separated from the rear half-frame (12). Therefore, the electric scooter can be divided into two independent parts. To package, to store or to transport the electric scooter is more convenient.

With reference to FIGS. 2 to 5, the frame is assembled by first rotating the arm (24) to move the pin (27) into the rear half-frame (12). The front half-frame (10) is then moved to a position where the bore (222) in the locking plate (22) aligns with the head (272) on the pin (27). The recess (224) in the free end of the locking plate (22) engages a post (122) integrally protruding from the rear half-frame (12). Consequently, the locking plate (22) can be exactly positioned to align the bore (222) with the pin (27) by means of the engagement between the post (122) and the recess (224) in the locking plate (22). In addition, the positioning device comprising the post (122) in the rear half-frame (12) and the recess (224) in the locking plat (22) can also keep the front half-frame (10) from rotating relative to the rear half-frame (24).

When the user releases the arm (24), the compressed biasing member (28) will push the pin (27) out from the rear half-frame (12) and into the bore (222) in the locking plate (22). Accordingly, the front half-frame (10) and the rear half-frame (12) connected by the locking device (20).

The locking plate (22) can be mounted on the rear half-frame (12) with the post (122), the arm (24) and the pin (27) on the front half-frame (10). This arrangement can also be used to connect the front half-frame (10) to the rear half-frame (12).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A separable frame for an electric scooter having at least one front wheel, two rear wheels, a steering bar, a seat and an electric motor, the frame comprising:

a front half-frame adapted to mount the at least one front wheel and the steering bar of the scooter;

a rear half-frame detachably attached to the front half-frame with at least one locking device and adapted to mount the rear wheels, the seat and the electric motor of the scooter; and a positioning device arranged between the front half-frame and the rear half-frame to keep the front half-frame from rotating relative to the rear half-frame, wherein each locking device comprises:

a locking plate secured to the front half-frame and having a bore defined in the locking plate;

a pin retractably mounted on the rear half-frame and having one end extending out from the rear half-frame to insert into the bore in the locking plate; and an arm pivotally attached to the rear half-frame to pull the pin to disengage from the bore in the locking plate when the arm pivots relative to the rear half-frame.

2. The frame as claimed in claim 1, wherein each locking device further has:

a stub extending from the rear half-frame with the arm being pivotally connected to the stub;

a through hole defined longitudinally through the stub for the pin to extend through the through hole;

a spiral recess longitudinally defined through half the circumference of the free end of the stub and around the through hole so that a spiral face is defined on the spiral recess;

a knob formed on one end of the arm and rotatably attached to the stub;

a blind hole defined perpendicular to the arm in the free end of the knob for the pin to be securely mounted in the blind hole; and a spiral extension integrally protruding from the free end of the knob and received in the spiral recess in the stub, wherein the spiral extension has a spiral face defined in the free end of the spiral extension and mating with the spiral face in the stub, thereby the spiral face in the stub will push the extension outfrom the stub so as to pull the end of the pin exposed from the rear half-frame into the rear half-frame when the arm is rotated.

3. The frame as claimed in claim 2 further comprising a shoulder formed between the flat end of the stub and the end of the recess with the deepest depth; and a shoulder formed between the extension with the largest thickness and the knob to abut to the shoulder on the stub to limit the rotation of the arm.

4. The frame as claimed in claim 2, wherein the pin has a head with a diameter larger than that of the pin and extending out from the rear half-frame to insert into the bore in the locking plate.

5. The frame as claimed in claim 4 further comprising a biasing member received in the rear half-frame and having two ends respectively abutting the head on the pin and the rear half-frame to provide a biasing force to the pin.

6. The frame as claimed in claim 2 further comprising a keyhole radially defined in the knob and communicating with the blind hole;

a locking-hole defined in the pin; and a key-pin extending through the keyhole in the knob and into the locking-hole in the pin to connect the pin to the knob with the pin.

7. The frame as claimed in claim 1 further comprising a biasing member mounted in the rear half-frame and having two ends respectively abutting the pin and the rear half-frame to provide a biasing force to the pin.

8. The frame as claimed in claim 1, wherein the positioning device comprises a post integrally protruding from the rear half-frame; and a recess defined in the free end of the locking plate to receive the post on the rear half-frame so as to keep the front half-frame from rotating relative to the rear half-frame and exactly position the front half-frame to the rear half-frame at a position where the bore in the locking plate exactly aligns with the pin.

9. A separable frame for an electric scooter having at least one front wheel, two rear wheels, a steering bar, a seat and an electric motor, and the frame comprising:

a front half-frame adapted to mount the at least one front wheel and the steering bar of the scooter;

a rear half-frame detachably attached to the front half-frame with at least one locking device and adapted to mount the rear wheels, the seat and the electric motor of the scooter; and a positioning device arranged between the front half-frame and the rear half-frame to keep the front half-frame from rotating relative to the rear half-frame, wherein each locking device comprises:

a locking plate secured to the rear half-frame and having a bore defined in the locking plate;

a pin retractably mounted on the front half-frame and having one end extending out from the front half-frame to insert into the bore in the locking plate; and an arm pivotally attached to the front half-frame to pull the pin to disengage from the bore in the locking plate when the arm pivots relative to the front half-frame.

10. The frame as claimed in claim 9, wherein each locking device further has:

a stub extending from the front half-frame with the arm being pivotally connected to the stub;

a through hole defined longitudinally through the stub for the pin to extend through the through hole;

a spiral recess longitudinally defined through half the circumference of the free end of the stub and around the through hole so that a spiral face is defined on the recess;

a knob formed on one end of the arm and rotatably attached to the stub;

a blind hole defined perpendicular to the arm in the free end of the knob for the pin to be securely mounted in the blind hole; and a spiral extension integrally protruding from the free end of the knob and received in the spiral recess in the stub, wherein the spiral extension has a spiral face defined in the free end of the spiral extension and mating with the spiral face in the stub, thereby the spiral face in the stub will push the extension out from the stub so as to pull the end of the pin exposed from the front half-frame into the front half-frame when the arm is rotated.

11. The frame as claimed in claim 10 further comprising a shoulder formed between the flat end of the stub and the end of the recess with the deepest depth; and a shoulder formed between the extension with the largest thickness and the knob to abut to the shoulder on the stub to limit the rotation of the arm.

12. The frame as claimed in claim 10, wherein the pin has a head with a diameter larger than that of the pin and extending out from the front half-frame to insert into the bore in the locking plate.

13. The frame as claimed in claim 12 further comprising a biasing member received in the front half-frame and having two ends respectively abutting the head on the pin and the front half-frame to provide a biasing force to the pin.

14. The frame as claimed in claim 10 further comprising a keyhole radially defined in the knob and communicating with the blind hole;

a locking-hole defined in the pin; and a key-pin extending through the keyhole in the knob and into the locking-hole in the pin to connect the pin to the knob with the pin.

15. The frame as claimed in claim 9 further comprising a biasing member mounted in the front half-frame and having two ends respectively abutting the pin and the front half-frame to provide a biasing force to the pin.

16. The frame as claimed in claim 9, wherein the positioning device comprises a post integrally protruding from the front half-frame; and a recess defined in the free end of the locking plate to receive the post on the front half-frame so as to keep the front half-frame from rotating relative to the rear half-frame and exactly position the front half-frame to the rear half-frame at a position where the bore in the locking plate exactly aligns with the pin.

* * * * *